(No Model.) 3 Sheets—Sheet 2.
S. AYERS.
EXTENSIBLE BICYCLE CRANK.
No. 561,553. Patented June 9, 1896.
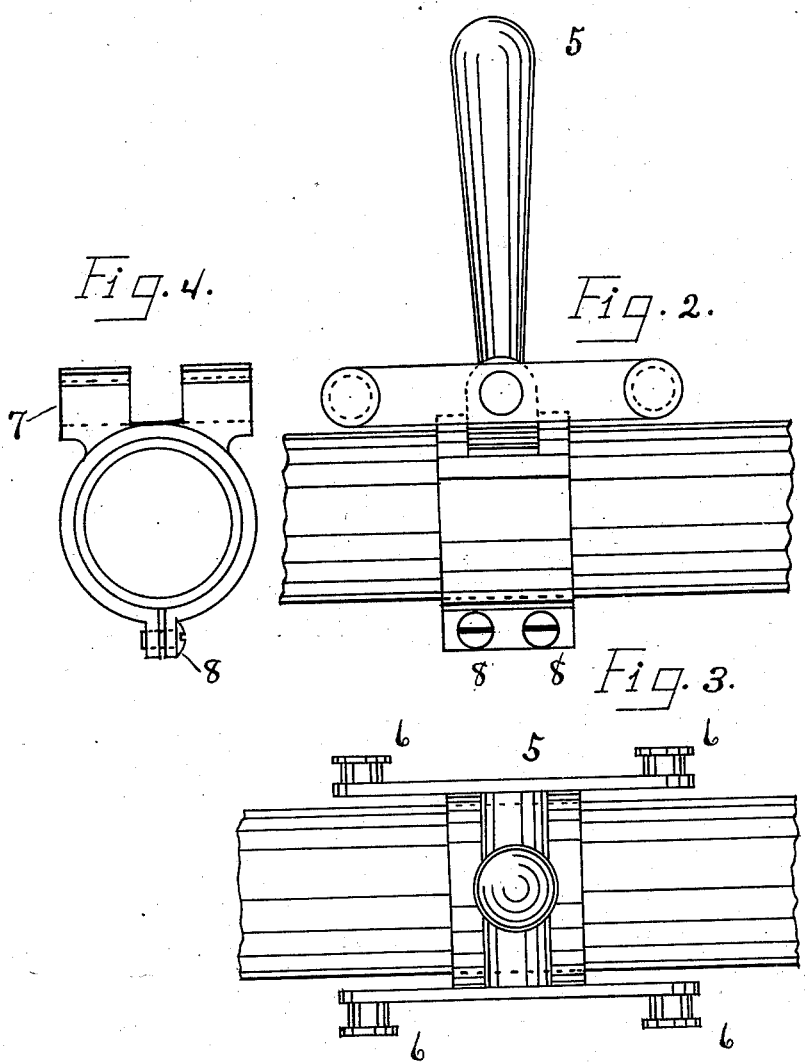
Witnesses
L. Snow.
Theo Bemis
Inventor
Sherman Ayers.
By his Attorney
J. H. Snow.

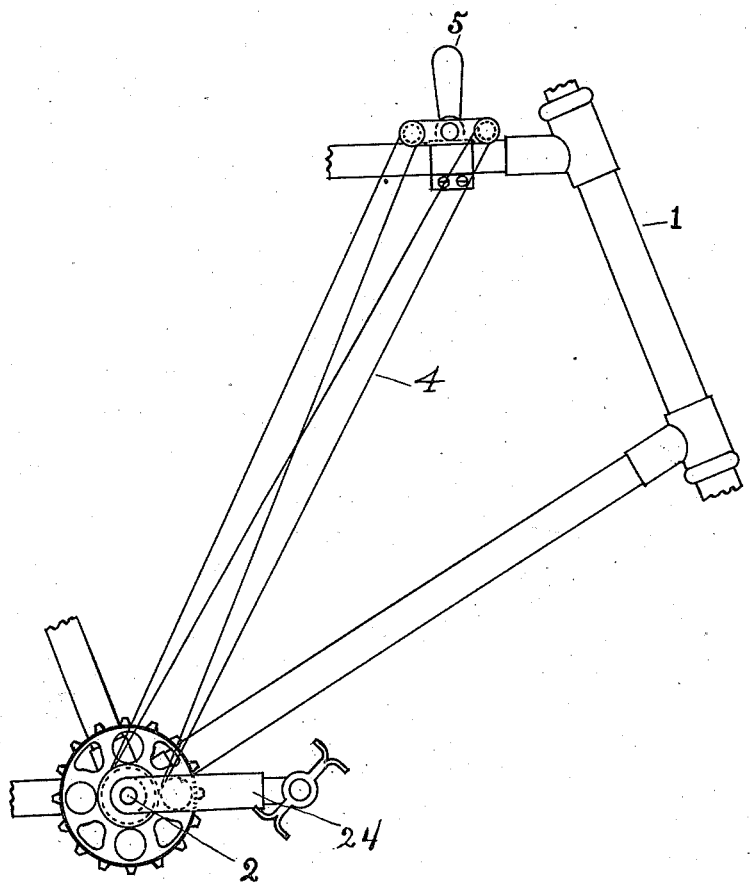

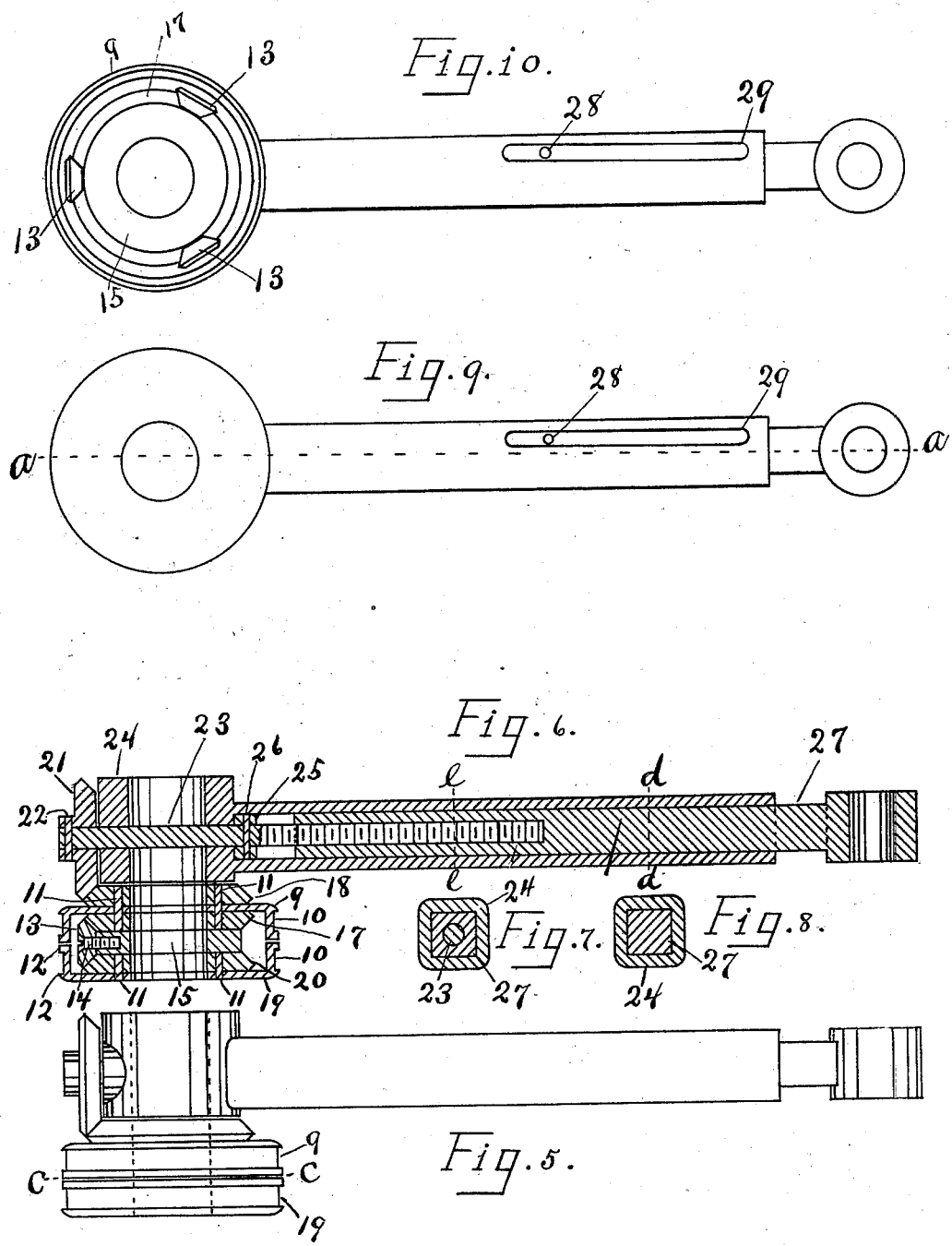

UNITED STATES PATENT OFFICE.

SHERMAN AYERS, OF FOUNTAINTOWN, INDIANA.

EXTENSIBLE BICYCLE-CRANK.

SPECIFICATION forming part of Letters Patent No. 561,553, dated June 9, 1896.

Application filed August 15, 1895. Serial No. 559,347. (No model.)

*To all whom it may concern:*

Be it known that I, SHERMAN AYERS, a citizen of the United States, residing at Fountaintown, in the county of Shelby and State of Indiana, have invented a new and useful Extension for Bicycle-Cranks, of which the following is a specification.

My invention relates to extension bicycle-cranks for bicycles, tricycles, and similar vehicles; and it has for its object to provide simple, inexpensive, and efficient means for adjusting the cranks of machines of the class mentioned to secure either power or speed, such means of adjustment being positive and not liable to disarrangement or displacement through accident.

In the drawings, Figure 1 is a side view of a portion of a bicycle provided with an extension-crank constructed in accordance with my invention. Fig. 2 is a side view of the locking-lever. Fig. 3 is a top view of the locking-lever. Fig. 4 is a front view of the clamp that secures the locking-lever to the frame of the bicycle. Fig. 5 is a top view of the extension-crank. Fig. 6 is a sectional view of the extension-crank, taken on a line $a\,a$ in Fig. 9. Fig. 7 is a sectional view taken on the line $e\,e$, Fig. 6. Fig. 8 is a sectional view taken on the line $d\,d$, Fig. 6. Fig. 9 is a side view of the extension-crank. Fig. 10 is a side view of the extension-crank, taken on the line $c\,c$, Fig. 5.

Similar numerals of reference indicate corresponding parts in all the figures of the drawings.

1 designates the frame of a bicycle of the ordinary or any preferred construction, and 2 being the crank-shaft, to the extremities of which are attached the crank 24, 4 being the belts leading from the extension-crank 24 to the locking-lever 5. The locking-lever 5 is provided with the spools 6 for holding the belts 4.

7 is the clamp for holding the locking-lever to the frame of the bicycle by tightening the screws 8, 9 and 19 being boxes to which the friction-wheels are attached by means of pins 11, the boxes 9 being provided with projections 12 on their periphery, between which the belts 4 rest on the boxed space 10. The friction-wheels 17 and 18 being secured to the box 9, by means of the pins 11, form a double friction-wheel, which works in connection with the friction-wheels 13. Wheels 13 are secured to the plain wheel 15 by means of the screw 14.

20 is a friction-wheel secured to box 19 by means of pins 11. Friction-wheel 18 works against friction-wheel 21. The friction-wheel 21 is secured to shaft 23 by means of pin 22. Shaft 23 passes through the crank 24 and is secured thereto by means of the collar 25, which is made fast to the shaft 23 by passing the pin 26 through both collar and shaft. The shaft 23 passes into and is connected with the extension-crank 27 by means of the threaded portion, as shown. The crank 24 and the extension-crank 27 fitting each other, as shown in Fig. 8, are both square, as shown.

When the locking-lever is pressed forward, it tightens one set of the belts 4 on the boxes 9 and stops the boxes 9 from revolving around the crank-shaft 2, and the friction-wheel 21 will then be revolved as the crank 24 is operated and will draw the extension-crank 27 in by means of the threaded portion of the shaft 23 working in the threaded portion of the extension-crank 27. When the locking-lever is drawn back to its extreme limit, it will release the belts on the boxes 9 and tighten the opposite set of belts on the boxes 19, and thus hold the boxes 19 from revolving around the crank-shaft 2, and by so doing it will revolve the friction-wheels 13 in the opposite direction, moving the friction-wheels 17 and 18 in the opposite direction from the way they revolve when the locking-lever is pressed forward. Thus the friction-wheel 21 is reversed, and by this motion the shaft 23 is reversed and pushes the extension-crank out until the pin 28 reaches the extreme outer end of the slot 29, which extreme end is reached before the shaft 23 is unscrewed from the extension-crank 27. Should the locking-lever be held in either direction until the shaft 23 is revolved to its extreme limit, the belts 4 will then slide on the boxes 9 or 19, as the case may be. The friction thus caused is easily detected by the rider, and the locking-lever is then released and it will resume its normal perpendicular position and all the belts will be released.

The operation of the improved extension-crank will be readily understood from the foregoing description, as well as the positiveness of the adjustment, whereby displacements of the parts is prevented, and it will be obvious that various changes in the form, proportion, and minor details of construction may be resorted to without departing from the spirit or sacrificing any of the advantages of the invention.

Having thus described my invention, I claim—

In a crank for bicycles, the combination, of the oscillating belt-spools 6, the friction-belts 4, adapted to connect the spools 6 with the boxes 9 and 19, the boxes 9 and 19 adapted to connect with and operate the gears 17 and 20, the gears 17 and 20 adapted to connect and operate the gears 13, the gears 13 mounted on the disk 15, the gear 18 secured to the box 9 and the gear 17 and adapted to rotate in connection with the gear 21, the gear 21 secured to the screw 23 and adapted to extend or withdraw the crank 27, substantially as described.

In testimony that I claim the foregoing as my own I have hereunto affixed my signature in the presence of two witnesses.

SHERMAN AYERS.

Witnesses:
GEO. H. BATCHELOR,
GUY WINSTON.